（12） United States Patent
Takeuchi et al.

(10) Patent No.: US 10,286,375 B2
(45) Date of Patent: May 14, 2019

(54) REACTION APPARATUS

(71) Applicant: IHI CORPORATION, Tokyo (JP)

(72) Inventors: Yusuke Takeuchi, Tokyo (JP); Akihisa Yano, Tokyo (JP); Tatsuya Oka, Tokyo (JP); Takahito Akita, Tokyo (JP); Taiga Yamamoto, Tokyo (JP); Hideshi Shibuya, Tokyo (JP); Yushi Kameoka, Tokyo (JP); Koki Yasui, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/003,317

(22) Filed: Jun. 8, 2018

(65) Prior Publication Data

US 2018/0290121 A1 Oct. 11, 2018

Related U.S. Application Data

(63) Continuation of application No. PCT/JP2017/002358, filed on Jan. 24, 2017.

(30) Foreign Application Priority Data

Jan. 25, 2016 (JP) ................................. 2016-011370

(51) Int. Cl.
*B01J 19/00* (2006.01)
*B01J 19/24* (2006.01)
*F28F 27/00* (2006.01)
*F28F 27/02* (2006.01)
(Continued)

(52) U.S. Cl.
CPC ........... *B01J 19/0013* (2013.01); *B01J 19/24* (2013.01); *B01J 19/249* (2013.01); *F28D 9/0037* (2013.01); *F28F 27/00* (2013.01); *F28F 27/02* (2013.01); *B01J 2219/0006* (2013.01); *B01J 2219/00063* (2013.01); *B01J 2219/00081* (2013.01); *F28D 2021/0022* (2013.01)

(58) Field of Classification Search
CPC .................. B01J 19/0013; B01J 19/249; B01J 2219/0006; B01J 2219/00063; B01J 2219/00096; F28D 9/0037; F28D 2021/0022; F28F 27/02
See application file for complete search history.

(56) References Cited

U.S. PATENT DOCUMENTS

2005/0006372 A1 1/2005 Murakami
2017/0136432 A1* 5/2017 Bonner ................ B01J 19/0093

FOREIGN PATENT DOCUMENTS

| JP | 2002-143675 A | 5/2002 |
| JP | 2003-035611 A | 2/2003 |
| JP | 2005-040784 A | 2/2005 |

(Continued)

*Primary Examiner* — Lessanework Seifu

(57) ABSTRACT

A reactor has a heat exchanging body having a heat medium flow channel that a heat medium fluid flows and a reaction flow channel that a reaction fluid flow, and at least one detection part for detecting temperature of a fluid in one or both of the heat medium flow channel and the reaction flow channel. At least one installation hole extends in a skew position to the flow channel and includes an opening portion communicating with the flow channel. The detection part is installed at the opening portion and contacts the flowing fluid. At least one fluid guide hole is formed along the flow channel from the opening portion of the installation hole.

9 Claims, 6 Drawing Sheets

(51) Int. Cl.
*F28D 9/00* (2006.01)
*F28D 21/00* (2006.01)

(56) References Cited

FOREIGN PATENT DOCUMENTS

| | | |
|---|---|---|
| JP | 2006-130599 A | 5/2006 |
| JP | 2006-133189 A | 5/2006 |
| JP | 2007-275823 A | 10/2007 |
| JP | 2008-051789 A | 3/2008 |
| JP | 2008-215873 A | 9/2008 |
| JP | 2013-164377 A | 8/2013 |
| JP | 2014-151298 A | 8/2014 |

\* cited by examiner

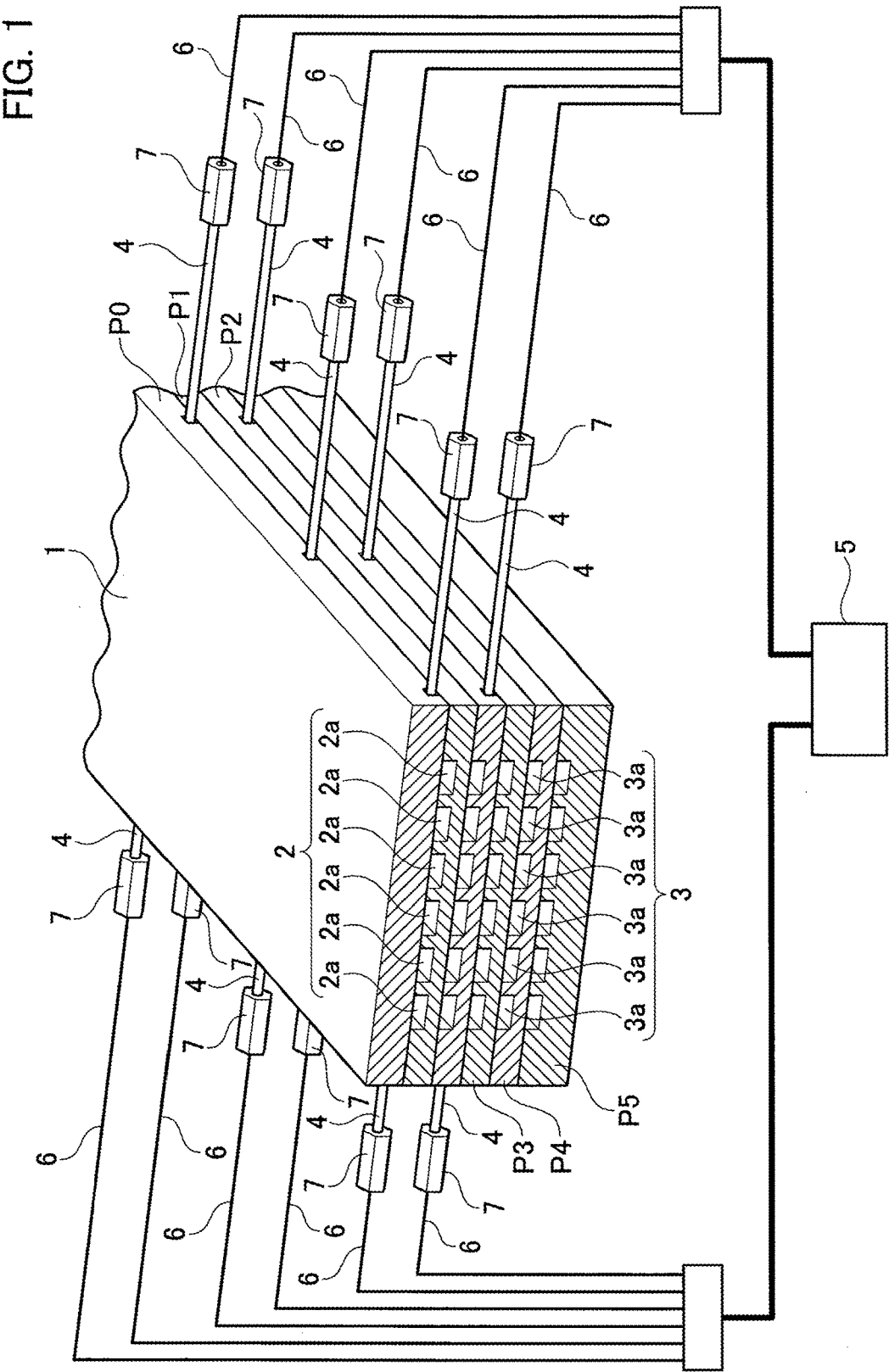

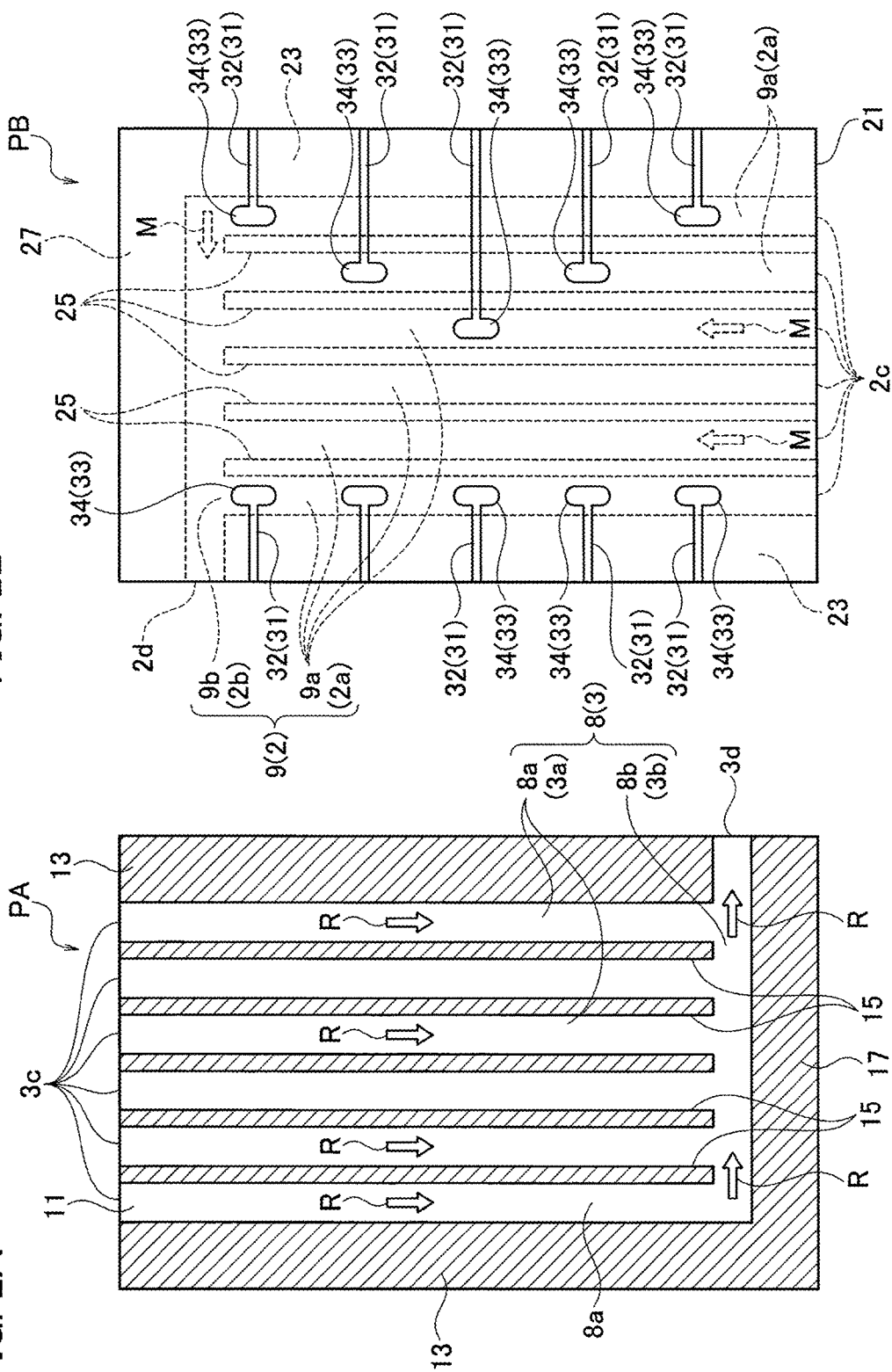

REACTION APPARATUS

CROSS REFERENCE TO RELATED APPLICATIONS

This application is a continuation application of International Application No. PCT/JP2017/002358, filed on Jan. 24, 2017, which claims priority of Japanese Patent Application No. 2016-011370, filed on Jan. 25, 2016, the entire contents of which are incorporated by reference herein.

BACKGROUND

Technical Field

The present disclosure relates to a heat exchange-type reactor that heats or cools a reaction fluid being a fluid containing a reactant (reaction raw material), using heat exchange with a heat medium fluid, to cause a chemical reaction of the reactant to progress.

Description of the Related Art

Heat exchange-type reactors are known as chemical reactors that heat or cool a fluid in a gaseous or liquid state containing a reactant (reaction raw material) to cause a reaction of the reactant to progress. Such a reactor includes, in the apparatus, a reaction flow channel in which a reaction fluid is caused to flow and a heat medium flow channel in which a heat medium fluid is caused to flow. The reaction fluid and the heat medium fluid are each supplied through an entrance and discharged from an exit, and the heat exchange between them progresses during this period. Usually, to promote the heat exchange, the reaction flow channel and the heat medium flow channel, provided in the reactor, are each formed to separate into a plurality of flow channels, thereby increasing the heat transfer area. Also, since the progress of a chemical reaction can be promoted by use of a catalyst, placing a catalyst inside the reaction flow channel can improve the efficiency of the reaction inside the reaction flow channel.

Also, heat exchange-type reactors can be configured to use a fluid that can supply the heat of reaction generated by its reaction, instead of the heat medium fluid, which supplies heat or cold. In this case, a reactive fluid such as a combustion gas is supplied to the heat medium flow channel, and the heat or cold generated by its reaction is transferred to the reaction fluid in the reaction flow channel. Japanese Patent Application Laid-Open No. 2002-143675 (Publication Document 1 in the Publication List below) describes a plate fin-type reactor with a structure in which catalytic combustion chambers and reforming chambers are alternately stacked, and states that the catalytic combustion chambers and the reforming chambers include respectively fins on which a combustion catalyst or a reforming catalyst is supported. In the reactor of Publication Document 1, a reaction progresses on both the side that supplies heat and the side that demands heat and a good heat balance is therefore needed between the catalytic combustion and the reforming. To address this, Patent Literature 1 describes use of catalyzing fins of different properties to control the reaction rates.

The change in temperature of the reaction fluid while it flows through the reaction flow channel is an important factor for the progress of the reaction in the reaction fluid and the heat-resistant structure of the reactor. Japanese Patent Application Laid-Open No. 2008-215873 (Publication Document 2) describes a sensor unit that measures state quantities of a fluid at a fluid input side and/or output side of a microreactor device. In this literature, a plurality of sensor installation holes are provided in the wall surface of a flow channel along its circumferential direction at the measurement position, and the sensing parts of a plurality of types of sensors are installed there to detect the state quantities of the fluid.

DOCUMENT LIST

Publication Document 1: Japanese Patent Application Laid-Open No. 2002-143675
Publication Document 2: Japanese Patent Application Laid-Open No. 2008-215873

BRIEF SUMMARY

The heat balance between the reaction fluid and the heat medium fluid affects the progress of the reaction in the reaction flow channel. It is therefore important to adjust the heat balance to a good balance for efficient progress of the reaction in the reaction fluid. To do so, it is desired to be able to measure the temperature of the fluids flowing in the reactor. Also, the durability of the reactor is lowered if deformation of the reactor due to the thermal stress occurs. Therefore, if it is possible to know the temperature conditions inside the apparatus in detail, it is useful for the designing and improvement of the apparatus. Thus, being able to know temperature conditions inside the reactor accurately and in detail is very useful in improving the reaction efficiency and operation cost of the reactor as well as the durability of the apparatus and so on.

An object of the present disclosure is to provide a heat exchange-type reactor that includes a measurement mechanism capable of measuring the temperature of a fluid with good precision without increasing the resistance to flow of the fluid, and that can accurately find out the internal temperature.

To solve the above problem, the present inventors have implemented an accurate internal temperature measurement by discovering a configuration capable of measuring the temperature of a fluid with high precision without increasing the resistance to flow of the fluid by providing a fluid guide hole that promotes contact between a temperature detection part installed inside the reactor and the fluid. As a result, the present inventors have reached the technique of the present disclosure.

According to an aspect of the present disclosure, a reactor is summarized such that it has a heat exchanging body including therein a heat medium flow channel in which a heat medium fluid is caused to flow, and a reaction flow channel in which a reaction fluid is caused to flow, and at least one detection part that detects temperature of a fluid flowing in at least one flow channel of the heat medium flow channel and the reaction flow channel, and that the heat exchanging body includes at least one installation hole formed to extend in a skew position with respect to the at least one flow channel so as to include an opening portion communicating with the at least one flow channel, in which the at least one detection part is installed at the opening portion so as to be contactable with the fluid flowing in the at least one flow channel, and at least one fluid guide hole formed along the at least one flow channel from the opening portion of the at least one installation hole.

The above reactor can be configured such that a transmission line is connected to the at least one detection part, the at least one installation hole is formed to extend linearly from the opening portion to an outside, and the transmission line is installed in the at least one installation hole, and the detection result is sent to the outside of the heat exchanging body. The at least one installation hole may be formed to extend in a direction perpendicular to the at least one flow channel.

Further, the above reactor can be constructed such that the at least one fluid guide hole is formed in such a manner that it has a narrowing tip portion on an opposite side from the opening portion, and preferably, the fluid flowing in the at least one flow channel gradually spreads toward the opening portion. Also, the above reactor is preferably such that the at least one fluid guide hole is formed to be connected to the opening portion of the at least one installation hole with no step present therebetween and extends in two directions from the opening portion.

Also, the above reactor can be configured such that the at least one flow channel is formed to include a plurality of branch flow channels separating from each other, and, in this form, the at least one detection part may include a plurality of detection parts, the at least one installation hole may include a plurality of installation holes, and the plurality of installation holes may be respectively formed to extend in a skew position with respect to one of the plurality of branch flow channels so as to include an opening portion communicating with the one of the plurality of branch flow channels, and the at least one fluid guide hole may include a plurality of fluid guide holes respectively formed along one of the plurality of branch flow channels from the opening portion of the corresponding one of the plurality of installation holes.

Also, the above reactor can be configured such that the at least one detection part includes a first detection part that detects temperature of the heat medium fluid flowing in the heat medium flow channel, and a second detection part that detects temperature of the reaction fluid flowing in the reaction flow channel. The at least one installation hole can include a first installation hole formed to extend in a skew position with respect to the heat medium flow channel so as to include an opening portion communicating with the heat medium flow channel, in which the first detection part is installed at the opening portion so as to be contactable with the heat medium fluid flowing in the heat medium flow channel, and a second installation hole formed to extend in a skew position with respect to the reaction flow channel so as to include an opening portion communicating with the reaction flow channel, in which the second detection part being installed at the opening portion so as to be contactable with the reaction fluid flowing in the reaction flow channel. And, the at least one fluid guide hole can include a first fluid guide hole formed along the heat medium flow channel from the opening portion of the first installation hole, and a second fluid guide hole formed along the reaction flow channel from the opening portion of the second installation hole.

Also, in the above reactor, such a configuration is also possible that the at least one detection part includes a plurality of detection parts that detect the temperature of the fluid flowing in one flow channel of the heat medium flow channel and the reaction flow channel, the at least one installation hole includes a plurality of installation holes formed to extend in skew positions with respect to the one flow channel so as to include opening portions communicating with the one flow channel at mutually different positions, the plurality of detection parts being installed at each of the opening portions of the plurality of installation holes so as to be contactable with the fluid flowing in the one flow channel at mutually different positions, and the at least one fluid guide hole includes a plurality of fluid guide holes formed along the one flow channel from the opening portions of the plurality of installation holes.

According to the present disclosure, it is possible to provide a heat exchange-type reactor that can accurately measure the internal temperature with a measurement mechanism capable of measuring the temperature of a fluid with preferable precision without increasing the flow resistance of the fluid. It is therefore possible to measure the temperature distribution inside the reactor, as well as to adjust the reaction efficiency to an appropriate efficiency and maintain the durability by using the result of the measurement. This can contribute to improvement of the durability and usage life of the reactor, reduction of the maintenance cost, stable supply of the target reaction product, and reduction of the production cost.

BRIEF DESCRIPTION OF DRAWINGS

FIG. 1 is an explanatory view for schematically explaining the basic configuration of a reactor according to one embodiment of the present disclosure.

FIG. 2A and FIG. 2B are a set of plan views of two types of flat plates constituting a heat exchanging body of the reactor.

DETAILED DESCRIPTION OF EMBODIMENTS

Figure 3B:
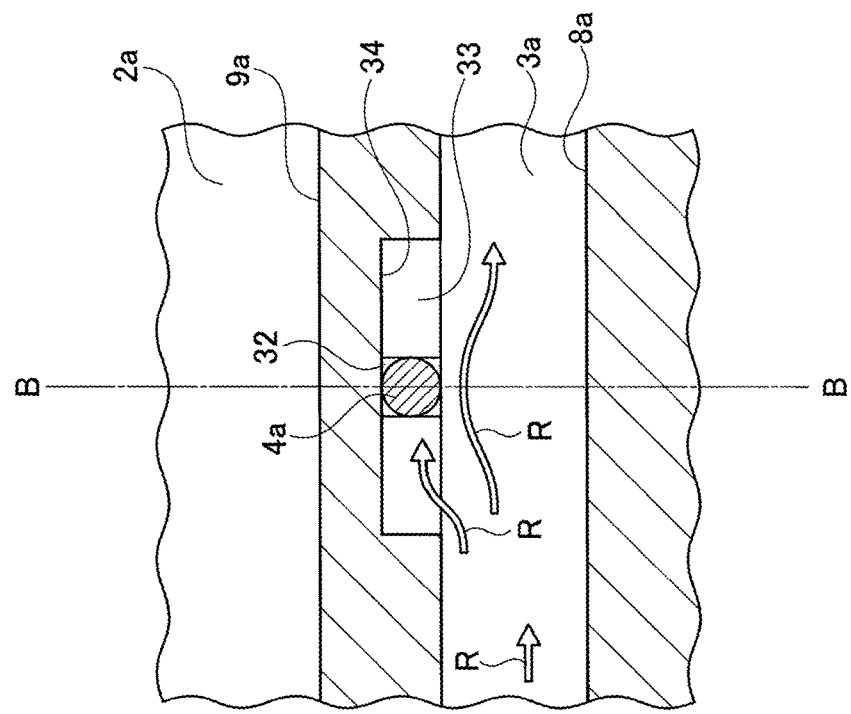
FIG. 3A and FIG. 3B are a set of cross-sectional views of a main portion of the heat exchanging body for explaining the configurations of an installation hole and a fluid guide hole, FIG. 3A being a cross-sectional view taken along line B-B in FIG. 3B, and FIG. 3B being a cross-sectional view taken along line A-A in FIG. 3A.

In a heat exchange-type reactor, the temperature distribution in a heat medium flow channel and a reaction flow channel from the entrance to the exit varies depending on the state of the thermal conduction from the heat medium flow channel to the reaction flow channel, but it also varies depending on other factors. Specifically, the temperature distribution changes also due to the temperature of a heat medium fluid supplied and the relationship between the temperature of the reaction fluid and the reaction rate. For an apparatus utilizing heat, it is important to know the internal temperature of the reactor in view of studying the progress of the reaction in the reaction fluid and the energy efficiency. Also, from the viewpoint of durability, it is desirable that an excessively large local temperature difference, in particular, a significant temperature difference in a high temperature range does not occur, in order to suppress the occurrence of distortion due to thermal stress. Thus various advantages can be obtained by knowing the temperature conditions inside the reactor.

A heat exchange-type reactor includes, as a main part thereof, a heat exchanging body having therein a heat medium flow channel in which a heat medium fluid is caused to flow and a reaction flow channel in which a reaction fluid is caused to flow. In order to enhance the efficiency of the heat transfer, heat exchanging bodies have been widely used which are configured such that the heat medium flow channel and the reaction flow channel are respectively separated into a plurality of branch flow channels and these many branch flow channels, extending side by side, are laid in a plurality of layers. If a detection probe or the like is inserted into the flow channel from the outer periphery of the heat exchanging body in order to detect the temperature of the internal fluid with respect to the heat exchanging body having such a complicated internal structure, measurement is possible for a flow channel located on the outer side. However, it is structurally difficult to detect the temperature in fluid channels on the inner side with this method. Also, a detection probe protruding into the flow channel is not preferable since it increases the flow resistance of the fluid and causes a decrease in energy efficiency due to pressure loss. In addition, a catalytic body that promotes the reaction and fins that enhance the heat transfer efficiency are often disposed inside the flow channels of the heat exchanging body. In such a case, if the detection probe protrudes into the flow channel, the assembly work becomes complicated and breakage is likely to occur. It is therefore difficult to make the detection probes project into the flow channels. On the other hand, the detection probe which does not protrude into the flow channel cannot be brought into good contact with fluids. Therefore, it is difficult for such a detection probe to quickly detect the temperature change of the fluid, and accurate measurement results cannot be obtained.

In the present disclosure, when an installation hole for installing a detection part that detects the temperature of a fluid is formed in a heat exchanging body, the installation hole is formed to extend in a skew position with respect to the flow channel of the measurement target so as to have an opening portion communicating with the flow channel. In addition, a fluid guide hole extending along the flow channel from the opening portion of the installation hole is formed, and the detection part is installed at the opening portion to be brought into contact with the fluid. The detection part does not project into the flow channel since it is located at the opening portion of the installation hole in the skew position. Without the fluid guide hole, the fluid in the flow channel will only flow in such a manner as to brush the side surface of the detection part, so that the contact between the fluid and the detection part will be insufficient. With the fluid guide hole formed, however, a part of the fluid flowing in the flow channel will flow into the fluid guide hole along the flow channel to reach the opening portion, so that a flow of the fluid colliding with the detection part is formed. Accordingly, the detection part can always come into good contact with the fluid flowing in the flow channel without increasing the flow resistance of the fluid, and thus accurately capture changes in temperature of the fluid.

The installation hole extends in a skew position with respect to the flow channel. Thus, even in a structure in which many branch flow channels separating from each other extend side by side, the installation hole can communicate with the target branch flow channel without penetrating through the other branch flow channels. It is therefore possible to accurately detect the temperature of the fluid either in a flow channel on the inner side or in a flow channel on the outer side in the heat exchanging body. By appropriately disposing a plurality of detection parts, it is possible to know the temperature distribution inside the heat exchanging body in detail. For example, by using a plurality of detection parts to detect the temperature of the fluid flowing in some of many branch flow channels extending side by side, it is possible to know, from the measurement results, the temperature difference between the branch flow channels extending side by side and the temperature distribution across them. Alternatively, by providing a plurality of installation holes so as to communicate with a single flow channel at mutually different positions and installing a plurality of detection parts there, it is possible to know the change in temperature in the flow direction of the flow channel. The present disclosure will present a reactor that accurately capture changes in temperature of a fluid based on the configuration in which at least one installation hole and at least one fluid guide hole are formed as described above and at least one detection part is installed in the installation hole.

Hereinbelow, embodiments of the present disclosure will be described in detail as mere examples with reference to the drawings. It is noted that the dimensions and the materials as well as the specific numerical values and so on described in the embodiments are mere examples for facilitating the understanding of the disclosed content, and are not intended to limit the present disclosure unless otherwise noted. Further, in the description and the drawings of the present application, redundant description of elements having substantially the same function and configuration will be omitted by denoting them with the same reference sign, and illustration of elements that are not directly related to the technique of the present disclosure will be omitted.

First, a system that measures the temperature inside a reactor according to one embodiment of the present disclosure will be briefly described with reference to FIG. 1 schematically illustrating the basic configuration of the reactor. The reactor in the present disclosure is a heat exchange-type reactor that utilizes heat exchange between a heat medium fluid and a reaction fluid to cause a reaction in the reaction fluid to progress, and includes a heat exchanging body 1 as exemplarily illustrated in FIG. 1 as its main part. The heat exchanging body 1 has therein a heat medium flow channel 2 in which the heat medium fluid is caused to flow and a reaction flow channel 3 in which the reaction fluid is caused to flow. The heat medium flow channel 2 and the reaction flow channel 3 are respectively separated into a plurality of branch flow channels 2a, 3a in order to increase the area of contact between the fluids and promote the heat transfer. The heat exchanging body 1 is configured as a multi-layer structure in which the heat medium flow channel 2 and the reaction flow channel 3 are arranged alternately. In the heat exchanging body 1 of FIG. 1, five layers of six branch flow channels 2a, 3a are formed; the branch flow channels 2a at the odd-number layers in the vertical direction are the heat medium flow channels 2, and the branch flow channels 3a at the even-number layers therebetween are the reaction flow channels 3. However, the present disclosure is not of course limited to this. It is note that, in FIG. 1, the heat exchanging body 1 is illustrated only at its portion including the branch flow channels 2a, 3a, separating from each other, in order to clearly indicate the arrangement of the heat medium flow channels 2 and the reaction flow channels 3, and the branch flow channels 2a, 3a are therefore depicted as penetrating through the heat exchanging body 1. However, the heat exchanging body of the reactor in the present disclosure can be configured as a heat exchanging body including heat medium flow channels 2 and reaction flow channels 3 each including a portion at which its branch flow channels are joined together, as will be described later with reference to FIG. 2A and FIG. 2B. The heat exchanging body can, of course, be configured as a structure similar to the heat exchanging bodies to be described with reference to FIG. 2A, FIG. 2B and subsequent figures, by using the heat exchanging body 1 illustrated in FIG. 1, through which the branch flow channels 2a, 3a penetrate, as a heat exchanging body middle portion and connecting, to its opposite sides, separate heat exchanging body end portions that allow the branch flow channels 2a and the branch flow channels 3a to be joined together into the heat medium flow channels 2 and the reaction flow channels 3, respectively.

In the present disclosure, the temperature measurement system includes temperature sensors 4 that measure temperatures inside the heat exchanging body 1. Detection parts of the temperature sensors 4 detect the temperature of the fluid flowing in at least one of the heat medium flow channels 2 and the reaction flow channels 3. In order to take the detection result (temperature information) detected by the detection part to the outside as an electric/electronic signal or the like, such a temperature sensor having a detection part to which a transmission line is connected for transmitting the temperature information is used. For example, as illustrated in FIG. 1, a probe-type temperature sensor including, at its tip, a detection part with a transmission line covered with a protection tube is fitted into the heat exchanging body 1, and the detection part is positioned to contact the fluid in the target flow channel. In this way, the detection result obtained by the detection part is sent to the outside of the heat exchanging body through the transmission line in the probe. The temperature sensor 4 can be appropriately selected and used from those commonly used in condition of use conditions. For example, it is possible to utilize a temperature sensor using a contact-type detection element such as a resistance temperature detector (RTD), a linear resistor, a thermistor, a thermocouple, and an IC temperature sensor. The temperature sensor 4 is connected to an input line 6 of a processing device 5 selected as appropriate in accordance with necessity such as a CPU, and the detection result can be processed into a desired form of temperature information. An airtight connector, in particular a high-pressure tubular connector is used to join the transmission line of the temperature sensor 4 and the input line 6 of the processing device 5, so that the pressure inside the heat exchanging body 1 is well maintained and prevented from leaking. Hence, the reaction and thermal process in the heat exchanging body 1 can be carried out under either a high-pressure condition or a low-pressure condition. For the airtight connector, there are various types of connectors such as a socket weld type and a threaded type, and examples include a seal connector using a metal gasket and the like. The connector to be used may be selected as appropriate from available connectors in consideration of conditions such as the pressure and the temperature to be handled in the reactor.

In the heat exchanging body 1 illustrated in FIG. 1, the temperature sensors 4 are positioned to measure the temperature of the heat medium fluid flowing in the branch flow channels 2a of the heat medium flow channels 2 at the first layer and the third layer from the top. However, the present disclosure is not of course limited to this. It is also possible to provide the temperature sensors 4 at all layers including the heat medium flow channels, or change the installation positions as necessity arises, so as to measure the fluid in the branch flow channels 3a of the reaction flow channels 3 or the fluids in both the branch flow channels 2a, 3a of the heat medium flow channels 2 and the reaction flow channels 3.

The heat exchanging body 1 with a multi-layer structure as in FIG. 1 can be configured as an assembly using flat plates with grooves for the flow channels formed on one side. In FIG. 1, the heat exchanging body 1 is formed by alternately stacking flat plates P1, P3, P5 with grooves for the heat medium flow channels 2 formed therein and flat plates P2, P4 with grooves for the reaction flow channels 3 formed therein, and mounting and assembling a flat plate P0 (lidding body) with no groove so as to cover the grooves of the uppermost flat plate P1. In such a heat exchanging body 1 of flat plate-stacking type as above, it is easy to perform processing for forming the installation hole of the temperature sensor 4 in the present disclosure. In the heat exchanging body formed by assembling the flat plates, the installation holes and fluid guide holes are formed by forming grooves in the flat plates with a cutting tool such as an endmill. The installation holes for the temperature sensors in the heat exchanging body of a flat plate-stacking type as above will be described with reference to FIG. 2B.

FIG. 2A and FIG. 2B are a set of plan views explaining a form of the grooves in the flat plates constituting the heat exchanging body. FIG. 2A illustrates the upper surface (the surface which the grooves are formed) of a flat plate PA that a groove 8 for the reaction flow channel 3 is formed. FIG. 2B illustrates the lower surface (the surface that contacts the flat plate PA when the flat plate PB is stacked on the flat plate PA) of a flat plate PB that a groove 9 for the heat medium flow channel 2 is formed. It is noted that the embodiment illustrated in FIG. 2A and FIG. 2B is configured to measure the temperature of the reaction fluid flowing in the reaction flow channel 3. The groove 8 and the groove 9, formed in the flat plate PA and the flat plate PB, respectively include grooves 8a or 9a for the branch flow channels 3a or the branch flow channels 2a of the reaction flow channel 3 or the heat medium flow channel 2, and a groove 8b or 9b for a merge channel 3b or a merge channel 2b at which the branch flow channels are joined together.

As illustrated in FIG. 2A, the flat plate PA includes a base portion 11, sidewall portions 13, intermediate wall portions 15, and an end wall portion 17. With the flat plate PB stacked on the flat plate PA, the groove 8 in the flat plate PA forms the reaction flow channel 3. The base portion 11 defines the bottom surface of the reaction flow channel 3. The sidewall portions 13, the intermediate wall portions 15, and the end wall portion 17 are provided to stand on the base portion 11 so as to define side surfaces of the reaction flow channel 3. The lower surface of the flat plate PB is the upper surface of the reaction flow channel 3. The sidewall portions 13 and the end wall portion 17 are provided along three ends of the flat plate PA. The intermediate wall portions 15 are formed in parallel and at equal intervals between the sidewall portions 13 of both sides. The grooves 8a extend side by side at equal intervals with the intermediate wall portions 15 interposed therebetween. One end of each groove 8a is connected perpendicularly to the groove 8b, while the opposite end is open to the outside, thereby forming an inlet port 3c of the reaction flow channel 3 in the state where the flat plate PB is stacked thereon. One end of the groove 8b penetrates through one of the sidewall portions 13 to be open to the outside thereof, thereby forming a discharge port 3d of the reaction flow channel 3 in the state where the flat plate PB is stacked thereon. In the state where the flat plate PB is stacked on the flat plate PA to form the heat exchanging body, the grooves 8a, 8b form a reaction flow channel 3 including a plurality (six in this embodiment) of branch flow channels 3a and a merge channel 3b whose cross sections perpendicular to the flow direction are rectangular. When the reaction fluid is introduced from the plurality of inlet ports 3c, the reaction fluid sequentially flows through the branch flow channels 3a and the merge channel 3b and flows out from the discharge port 3d.

The flat plate PB, in which the groove 9 for the heat medium flow channel 2 is formed, has a similar configuration to the flat plate PA. Specifically, as illustrated in FIG. 2B, the flat plate PB includes a base portion 21, sidewall portions 23, intermediate wall portions 25, and an end wall portion 27. With the flat plate PA or the flat plate P0 with no groove stacked on the flat plate PB, the groove 9 in the flat plate PB forms the heat medium flow channel 2. The base portion 21 defines the bottom surface of the heat medium flow channel 2. The sidewall portions 23, the intermediate wall portions 25, and the end wall portion 27 are provided to stand on the base portion 21 so as to define side surfaces of the heat medium flow channel 2. The lower surface of the flat plate PA or the flat plate P0 is the upper surface of the heat medium flow channel 2. The sidewall portions 23 and the end wall portion 27 are provided along three ends of the flat plate PB. The intermediate wall portions 25 are formed in parallel and at equal intervals between the sidewall portions 23 of the both sides. The grooves 9a extend side by side at equal intervals with the intermediate wall portions 25 interposed therebetween. One end of each groove 9a is connected perpendicularly to the groove 9b, while the opposite end is open to the outside thereof, thereby forming an inlet port 2c of the heat medium flow channel 2 in the state where the flat plate PA or the flat plate P0 is stacked thereon. One end of the groove 9b penetrates through one of the sidewall portions 23 and is open to the outside thereof, thereby forming a discharge port 2d of the heat medium flow channel 2 in the state where the flat plate PA or the flat plate P0 is stacked thereon. Thus, in the state where the flat plate PA or the flat plate P0 is stacked on the flat plate PB to form the heat exchanging body, the grooves 9a, 9b form a heat medium flow channel 2 including a plurality of (six in this embodiment) branch flow channels 2a and a merge channel 2b whose cross sections perpendicular to the flow direction are rectangular. When the heat medium fluid is introduced from the plurality of inlet ports 2c, the heat medium fluid sequentially flows through the branch flow channels 2a and the merge channel 2b and flows out from the discharge port 2d. The inlet ports 2c of the heat medium flow channel 2 and the inlet ports 3c of the reaction flow channel 3 are located opposite from each other, so that the heat medium fluid and the reaction fluid are supplied from opposite sides of the assembled heat exchanging body. Also, the discharge port 2d of the heat medium flow channel 2 and the discharge port 3d of the reaction flow channel 3 are located at the opposite ends of one side surface of the assembled heat exchanging body. In other words, it is configured in such a form that the heat medium fluid and the reaction fluid, flowing out of the flat plates PA, PB, stacked into a multi-layer shape, can be easily collected individually at opposite ends of one side surface of the heat exchanging body.

As illustrated in FIG. 2B, in the lower surface of the flat plate PB, there are formed grooves 32 for installation holes 31 into which probe-type temperature sensors are installed, and grooves 34 for fluid guide holes 33. In this embodiment, ten installation holes 31 are provided to install ten temperature sensors. Each of the grooves 32 for the installation holes 31 is formed to extend linearly in a direction perpendicular to the direction of flow in the branch flow channels 2a, 3a. In the state where the flat plate PB is stacked on the flat plate PA, each installation hole 31 is in a skew position with respect to the branch flow channels 3a of the reaction flow channel 3 (see FIG. 3A and FIG. 3B) and has, at the tip of the installation hole 31, an opening portion communicating with one of the branch flow channels 3a. The installation hole 31 extends from the opening portion to the outside, and the length of the installation hole 31 is set such that the detection part of the temperature sensor installed therein can contact the reaction fluid flowing in the target branch flow channel 3a at the opening portion. In other words, the length of the installation hole 31 is adjusted as appropriate in accordance with the position of measurement by the temperature sensor. The transmission line in the probe of the temperature sensor installed in the installation hole 31 extends from the opening portion to the outside and is electrically connected to the processing device 5.

The fluid guide holes 33 are formed along the branch flow channels 3a of the reaction flow channel 3 from the opening portions of the installation holes 31. In this embodiment, each fluid guide hole 33 is formed so as to cross the installation hole 31 in a T-shape by extending in two directions from the opening portion of the corresponding installation hole 31 toward opposite sides. However, the fluid guide hole 33 may be formed at least one side so as to extend in the direction against the flow of the reaction fluid (the upstream direction).

Figure 3A:
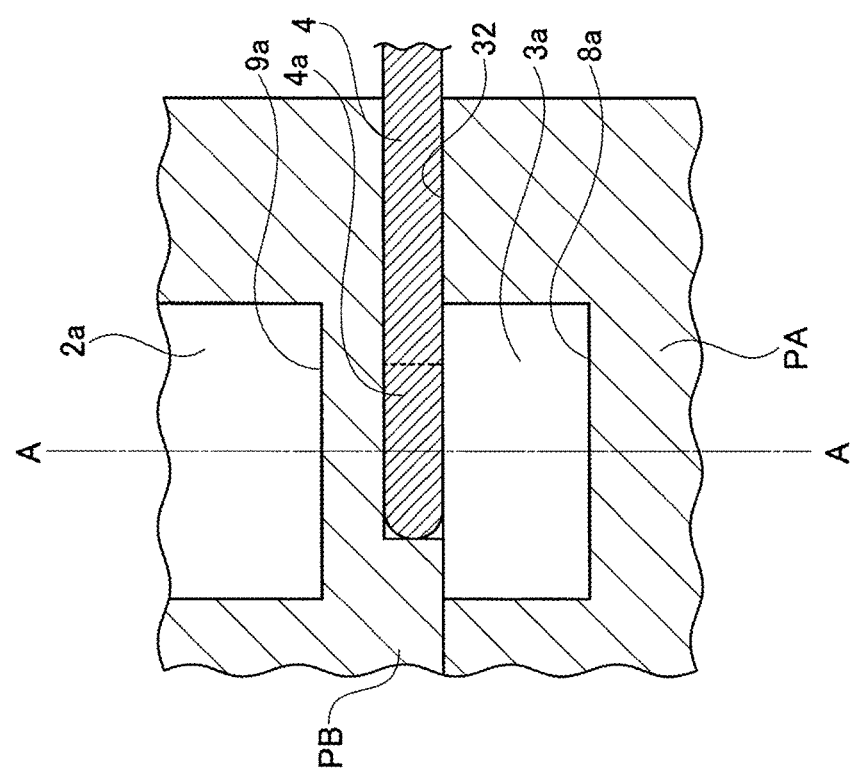
Figure 4A:
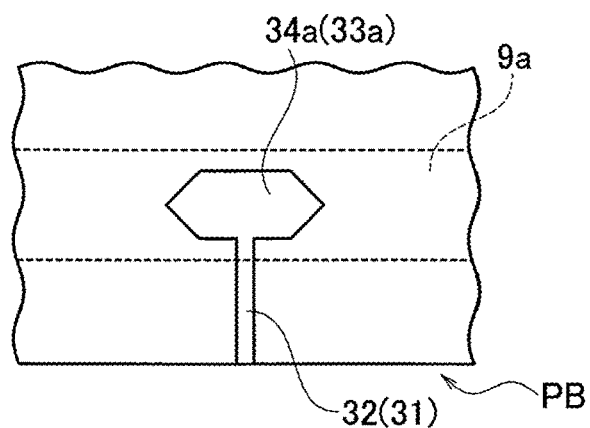
FIG. 4A and FIG. 4B are plan views of a main portion of flat plates, illustrating modifications of the fluid guide hole.
Figure 4B:
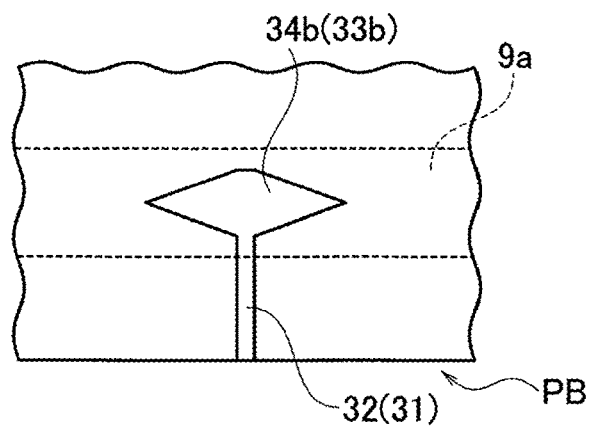

As illustrated in FIG. 3A, in the state where the flat plate PB is stacked on the flat plate PA, a detection part 4a of the temperature sensor 4 installed in the installation hole 31 contacts the reaction fluid flowing in the corresponding branch flow channel 3a of the reaction flow channel 3 at the opening portion of the installation hole 31. As illustrated in FIG. 3B, the branch flow channel 3a of the reaction flow channel 3 is expanded around the detection part 4a by the fluid guide hole 33. Accordingly, the flow of the reaction fluid flowing in the branch flow channel 3a spreads along the fluid guide hole 33, and the reaction fluid can therefore easily collide with or contact the detection part 4a. As illustrated in FIG. 2B, the fluid guide hole 33 is formed in such a form that the width of the tip portion is narrowed on the side opposite to the opening portion of the installation hole 31. Accordingly, the reaction fluid flowing into the fluid guide hole 33 from the branch flow channel 3a of the reaction flow channel 3 gradually spreads toward the opening portion of the installation hole 31. This is effective for suppressing turbulence flow and stagnation of the fluid. In this embodiment, the tip portions of the fluid guide hole 33 are curved in the shape of the side surface of a cylinder. However, the shapes of the fluid guide hole 33 and its tips can be determined as appropriate with the flow of the fluid taken into consideration. For example, as illustrated in FIG. 4A, a groove 34a for a fluid guide hole 33a may be formed such that its tip portions are angularly tapered, or as illustrated in FIG. 4B, a groove 34b may be formed such that the width of a fluid guide hole 33b linearly decreases from the opening portion toward each tip.

Figure 5:
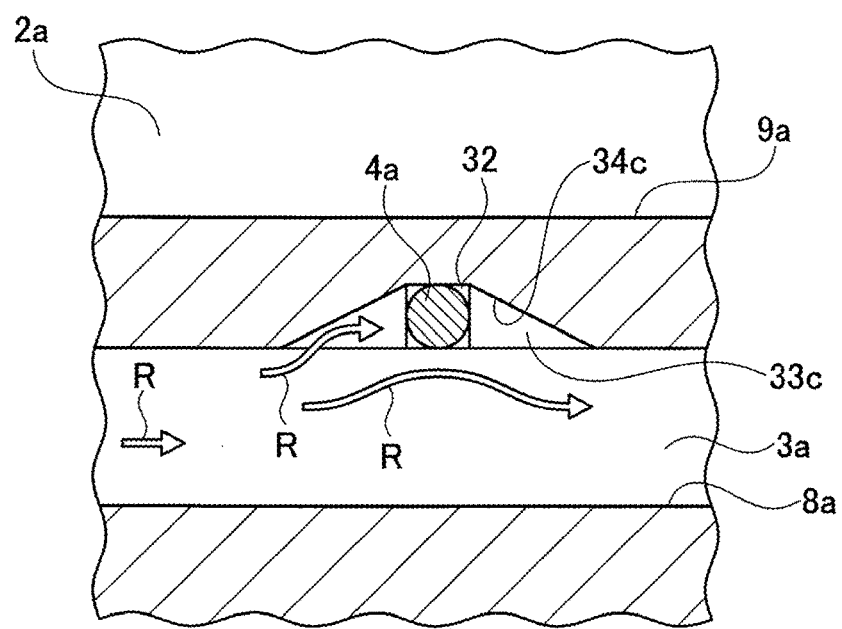
FIG. 5 is a cross-sectional view of a main portion of a flat plate, illustrating another modification of the fluid guide hole.

Also, as illustrated in FIG. 5, a groove 34c for a fluid guide hole 33c may be formed such that its depth gradually decreases from the opening portion toward each tip. This is preferable in view of achieving a smoother flow of the reaction fluid guided toward the opening portion. In FIG. 5, the groove 34c for the fluid guide hole 33c is formed such that its depth linearly decreases from the opening portion of the installation hole 31 toward each tip of the groove 34c. However, a modification may be employed in which the depth curvilinearly decreases or a modification may be employed in which the depth decreases only at the tip portions of the groove. Moreover, the groove 34 may be formed so that the center portion in the axial direction is deep and the both sides are shallow. Furthermore, a configuration as illustrated in FIG. 2A, FIG. 2B to FIG. 4A, FIG. 4B, in which the width of the groove 34 for the fluid guide hole 33 decreases at its tip portions or entire portion, may be combined with a configuration as illustrated in FIG. 5, in which the depth of the groove 34 for the fluid guide hole 33 decreases at its tip portions or entire portion. In this way, the flow of the reaction fluid can be further smoother. The shape of the fluid guide hole can be set and changed as appropriate by selecting the shape of the cutting edges of the cutting tool for forming the groove, replacing the cutting edges, and controlling the cutting operation.

In the embodiments illustrated in FIG. 2A, FIG. 2B to FIG. 5, the depth of the groove at the opening portion of the installation hole is equal to the depth of the groove for the fluid guide hole on the opening portion side. In other words, the fluid guide hole and the opening portion of the installation hole are formed to be connected smoothly to each other with no step present therebetween. If the groove for the fluid guide hole is deeper than the groove for the installation hole, the flow resistance of the fluid guided toward the detection part and the load applied to the detection part may possibly increase. For this reason, the depth of the groove for the fluid guide hole is preferably equal to or smaller than the depth of the groove for the installation hole. The configuration in which the fluid guide hole 33 extends in two directions from the opening portion of the installation hole 31 toward opposite sides is suitable for hydrodynamics. It is preferable to form the groove 34 such that the entire length of the fluid guide hole 33 is about 10 mm including the opening portion of the installation hole 31, in view of achieving a smooth flow of the fluid and good contact with the detection part.

The temperature sensor 4 can be installed in the installation hole 31 either before or after assembling the flat plates PA, PB into a heat exchanging body. The procedure in which the temperature sensor 4 is fitted into the installation hole 31 after the assembly is preferable in view of avoiding damage during the assembly work. In this case, in order to allow one to check whether the detection part 4a of the inserted temperature sensor 4 is located at the measurement position, a mark may be drawn on the probe of the temperature sensor 4, for example. This allows the detection part 4a to be reliably positioned, and is also effective in preventing breakage during the installation work. The detection part can be positioned without using any positioning mark by setting the length of the installation hole 31 such that the detection part 4a is suitably at the measurement position in the state where the tip (detection part) of the inserted temperature sensor 4 is in contact with the tip end of the installation hole 31. In this case, if the length of the detection part 4a is smaller than the width of the branch flow channel, the tip end of the installation hole formed does not coincide with the position of a side surface of the branch flow channel, as illustrated in FIG. 2B and FIG. 4 A, FIG. 4B, in order that the position of the detection part 4a can be located above the center of the branch flow channel. In other words, the width of the groove for the fluid guide hole is set to be smaller than the width of the branch flow channel. Such a limitation may not be employed in the case where contact of the temperature sensor 4 with the tip of the installation hole 31 is not utilized for the positioning, and the width of the groove for the fluid guide hole may be equal to the width of the branch flow channel.

As mentioned above, the installation hole 31 and the branch flow channel 3a of the reaction flow channel 3 are in skew positions with respect to each other. Then, in order for the detection part 4a of the temperature sensor 4 to come into good contact with the reaction fluid and detect its temperature, it is preferable to use a temperature sensor with a detection part 4a configured such that the detection element comes into contact with the measurement target on the side surface of the probe tip. Alternatively, instead of a probe type one, it is possible to utilize a temperature sensor in which a detection part containing a detection element is connected to a transmission line having a flexible and heat-resistant coating. In this case, it is preferable to assemble the heat exchanging body after installing the temperature sensor into the installation hole in the flat plate PA and/or the flat plate PB in advance.

In FIG. 2B, five installation holes are provided at equal intervals so as to have their opening portions communicating with different positions in one branch flow channel 3a at an outermost position among the six branch flow channels 3a. Of the ten temperature sensors 4, five sensors are installed in these installation holes, so that their detection parts 4a are arranged at equal intervals so as to be contactable with the reaction fluid flowing in this branch flow channel 3a at different positions. Hence, the temperature of the reaction fluid flowing in one branch flow channel 3a can be detected at a plurality of positions along the flow direction. On the other hand, the remaining five temperature sensors 4 are installed in five installation holes provided at equal intervals so as to have their opening portions communicating with different positions in three branch flow channels 3a on the opposite side from the above branch flow channel. In other words, their detection parts 4a are arranged at equal intervals so as to be contactable with the reaction fluid flowing in the three branch flow channels 3a at different positions. Hence, the temperature is detected for the reaction fluid flowing in the three branch flow channels 3a. The results of measurements by these temperature sensors 4 can be used to obtain two-dimensional temperature distribution of the reaction fluid flowing through the six branch flow channels 3a in the flat plate PA. Accordingly, it is possible to know the temperature change in the branch flow channel, the temperature difference between the outer peripheral portion and the central portion of the heat exchanging body, and so on.

Figure 6:
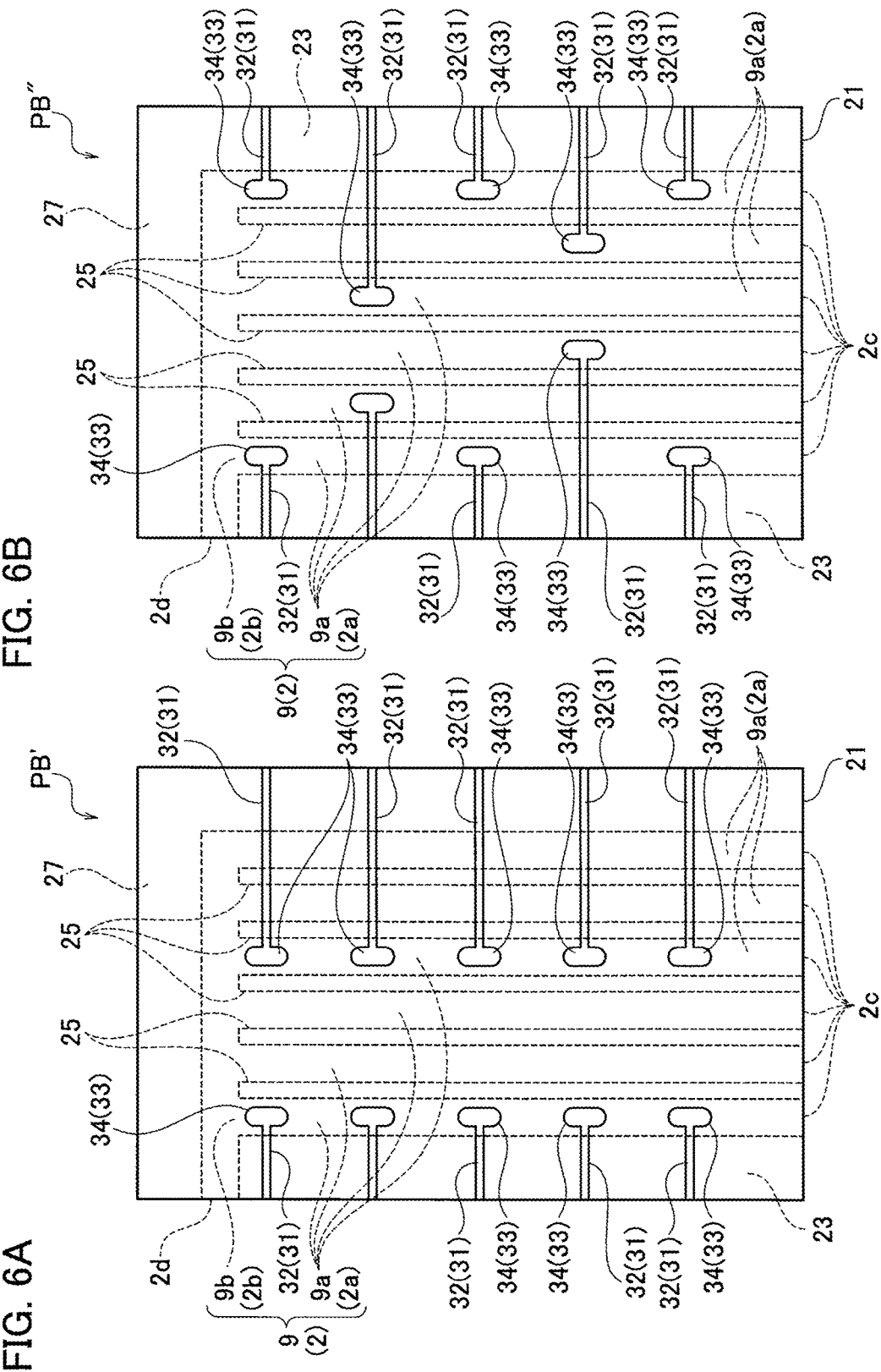
FIG. 6A and FIG. 6B are plan views illustrating modifications of the flat plates constituting the heat exchanging body of the reactor.

The arrangement of the detection parts 4a of the temperature sensors 4 is not limited to the arrangement based on the installation holes illustrated in FIG. 2B. For example, the grooves 32 for the installation holes 31 may be changed as those in a flat plate PB' illustrated in FIG. 6A. In the embodiment of FIG. 6A, the detection parts 4a are arranged so as to detect the temperature of the reaction fluid flowing in one branch flow channel 3a at an outermost position and one branch flow channel 3a at a central position among the six branch flow channels 3a at a plurality of different positions along the flow direction. In this case, it is possible to obtain a two-dimensional temperature distribution of the reaction fluid over the entire reaction flow channel 3 from the results of measurements at the outer and center portions by utilizing the symmetry of the branch flow channels 3a which extend in parallel. Alternatively, the grooves 32 for the installation holes 31 may be changed as in a flat plate PB" illustrated in FIG. 6B. In this case, the detection parts 4a are arranged to detect the temperature of the reaction fluid at at least one position in each of the six branch flow channels 3a. By approximating the arrangement of the detection positions to the uniform arrangement as illustrated, the precision of the temperature distribution obtained is enhanced. In FIG. 2B, FIG. 6A and FIG. 6B, the grooves 32 for the installation holes 31 are formed to use ten temperature sensors to measure the temperature. However, the number of temperature sensors to be used may be appropriately increased or decreased as necessity arises. Specifically, the number of temperature sensors to be set may be changed in accordance with the contents of required temperature information (such as the temperature change in the flow direction, the temperature difference between branch flow channels, the presence or absence of blockage of a flow channel and the influence thereof, etc.) and required precision of information. The number of temperature sensors 4 and detection parts 4a does not have to be equal to the number of branch flow channels 2a or branch flow channels 3a, and it can be set as appropriate in accordance with the necessity. Accordingly, the installation holes may be formed according to the number of temperature sensors.

FIG. 2A, FIG. 2B to FIG. 6A, FIG. 6B illustrate configurations that the grooves 32 for the installation holes 31 and the grooves 34 for the fluid guide holes 33 are formed in the lower surface of the flat plate PB, in which the groove 9 for the heat medium flow channel 2 is formed, and that the temperature of the reaction fluid flowing in the branch flow channels 3a of the reaction flow channel 3 is measured with the temperature sensors 4. Conversely, if forming the grooves 32 for the installation holes 31 and the grooves 34 for the fluid guide holes 33 in the lower surface of the flat plate PA, in which the groove 8 for the reaction flow channel 3 is formed, it is possible to measure the temperature of the heat medium fluid flowing in the branch flow channels 2a of the heat medium flow channel 3 with the temperature sensors 4. Likewise, by forming the grooves 32 for the installation holes 31 and the grooves 34 for the fluid guide holes 33 in the lower surfaces of both the flat plate PA and the flat plate PB, it is possible to measure the temperature of both the heat medium fluid and the reaction fluid. Specifically, the detection parts (first detection part) installed at the opening portions of the grooves for the installation holes (first installation holes) formed in the lower surface of the flat plate PA detect the temperature of the heat medium fluid flowing in the heat medium flow channel 2, whereas the detection parts (second detection part) installed at the opening portions of the grooves for the installation holes (second installation holes) formed in the lower surface of the flat plate PB detect the temperature of the reaction fluid flowing in the reaction flow channel 3. Further, the fluid guide hole (a first fluid guide hole or a second fluid guide hole) is formed to extend from the opening portion of each of the first installation hole and the second installation hole along the heat medium flow channel 2 or the reaction flow channel 3, thereby enhancing the contact between the fluid and the detection part.

When forming the grooves 32 for the installation holes 31 and the grooves 34 for the fluid guide holes 33 in the lower surfaces of a plurality of flat plates PA or flat plates PB (one of which may be replaced with the uppermost flat plate P0, it is possible to obtain a three-dimensional temperature distribution of the heat medium fluid or the reaction fluid flowing the heat medium flow channels 2 or the reaction flow channels 3. For example, if forming the grooves 32 for the installation holes 31 and the grooves 34 for the fluid guide holes 33 in the lower surfaces of the uppermost flat plate P0 and the flat plate P2 (corresponding to the flat plate PA) in the heat exchanging body 1 of FIG. 1, the temperature sensors 4 therein can measure the temperature of the reaction fluid flowing in the branch flow channels 2a of the heat medium flow channels 2 at the first and third stages from the top.

In the above-described embodiments, the grooves 32 are formed such that cross sections of the installation holes 31 are rectangular (square). However, they may be of a different shape. For example, the bottom surface of each groove 32 may be curved along the side surface of the probe to increase the degree of contact with the cylindrical probe of the temperature sensor 4 to be installed therein. In other words, the shape of the groove 32 can be changed as appropriate in accordance with the shape of the probe of the temperature sensor 4. Alternatively, the tip portion of the groove 32 maybe formed to gradually decrease in depth, so that tip surface of the installation hole 31 is inclined. In this case, the temperature sensor 4 can be installed in such a bent posture that its detection part contacting the inclined tip surface is slightly exposed to the branch flow channel from the opening portion when the temperature sensor is inserted from the outside into the installation hole 31 of the assembled heat exchanging body. In this configuration, however, the detection part is preferably exposed to such an extent as not to obstruct the flow of the fluid. Thus, in a case where a catalytic body or a heat transfer member is inserted in the branch flow channels, care is taken so that the detection part does not become an obstacle to these members.

In the above-described embodiments, each installation hole 31 extends in a direction perpendicular to the branch flow channels of the heat medium flow channel 2 or reaction flow channel 3. However, the installation hole 31 may be formed in a linear shape that is not perpendicular to the branch flow channels. When a plurality of measurement positions are close to each other, it is effective to form the grooves such that the extending directions of the installation holes are different from each other. For example, in a case of measuring the temperature of a fluid flowing in a plurality of adjacent branch channels at positions located at an equal distance from the separation points of the branch channels (or the merge channel) or in other similar cases, it is suitable to form the grooves so that the extension directions of the installation holes differ little by little.

Each of the installation holes 31 is in a skew position with respect to the branch channels of the heat medium flow channel 2 or reaction flow channel 3. However, an installation hole extending over a longer distance for measuring the fluid temperature in a branch flow channel located on an inner side of the heat exchanging body communicates also with the branch flow channel (s) located outward of that branch flow channel. In other words, branch flow channels arranged side by side can communicate with each other through the small gaps between the probes of the temperature sensors and the installation holes. However, this does not substantially affect the temperature measurement. If leakage of the fluid to the outside is a concern, the gaps between the temperature sensors and the installation holes are preferably sealed as necessary at the outer periphery of the heat exchanging body by using a heat-resistant sealing material. Alternatively, if the probe shape of the temperature sensors 4 is changeable or selectable, temperature sensors 4 with a probe shape in conformity with the shape of the grooves 32 may be installed. This can eliminate the gaps between the probes and the installation holes. For example, in the above-described embodiments, it is preferable to install temperature sensors whose probes have rectangular cross-sectional shape in conformity with the shape of the grooves 32. Alternatively, each temperature sensor may be configured to include detection parts at a plurality of positions on the side surface of its probe. In this case, using the structure that allows a single installation hole to communicate with a plurality of branch flow channels, a single temperature sensor can measure the temperature of the fluid in a plurality of branch channels.

In the above-described embodiments, the heat medium flow channel 2 and the reaction flow channel 3 are formed to include branch flow channels with the same width. However, they may be changed so as to have different widths if necessary. Also, the heat exchanging body has been described as a stack body in which heat-conductive bodies of a flat-plate shape are piled up. However, the configuration of the present disclosure can be utilized even in cases where the heat exchanging body is not a stack body as above. Specifically, it is applicable as long as the installation hole is possibly formed to extend in a skew position with respect to the flow channel in which the heat medium fluid or the reaction fluid flows, so as to have an opening portion communicating with the flow channel. By forming the fluid guide hole along the flow channel from the opening portion and installing a temperature sensor in the installation hole, the detection part of the temperature sensor located at the opening portion can come into good contact with the fluid without projecting into the flow channel and measure the temperature of the fluid. In other words, the above-described embodiments can be changed or modified as appropriate to apply to various reactors such as large reactors for plants, micro-reactors and the like. As a result, it is possible to accurately measure temperatures inside the heat exchanging body while preventing the decrease in energy efficiency due to the increase in flow resistance of the fluid and pressure loss. Therefore, it is possible to obtain instantaneous temperature information with high measurement precision.

Figure 7:
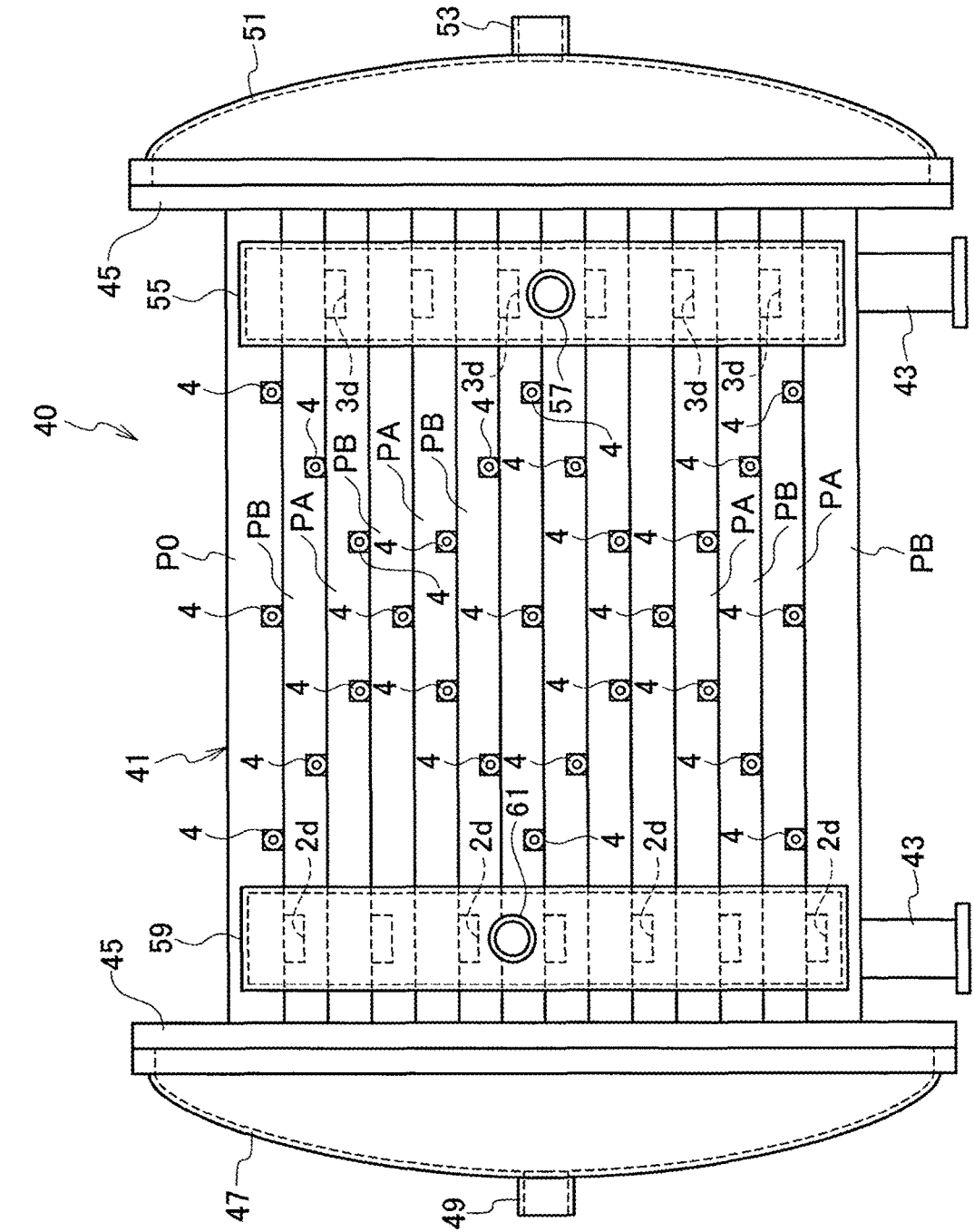
FIG. 7 is a side view illustrating one embodiment of a reactor configured using a heat exchanging body.

In the present disclosure, a heat exchanging body as described above can be used to configure a reactor, and a reaction in the reaction fluid is caused to progress by supplying heat or cold to the reaction fluid via heat exchange between the heat medium fluid and the reaction fluid. FIG. 7 is a schematic configuration diagram illustrating an example of the reactor. The reactor can also be utilized as a heat treatment apparatus by replacing the reaction fluid with another fluid.

A reactor 40 includes a heat exchanging body 41 as its main part. The heat exchanging body 41 is supported by rigid and heat-insulative support columns 43. As illustrated in FIG. 7, the heat exchanging body 41 includes a plurality of flat plates PA and flat plates PB and a flat plate P0 (lidding body). The flat plates PA, the flat plates PB, and the flat plate P0 are members of a rectangular flat plate shape, being made of a heat-resistant and heat-conductive material. Each of the flat plates PA and the flat plates PB has grooves for forming a heat medium flow channel or a reaction flow channel which are formed in one surface (upper surface) thereof. As described with reference to FIG. 2B, FIG. 6A and FIG. 6B, each of the flat plate P0, the flat plates PA, and the flat plates PB (excluding the lowermost flat plate PB) also has grooves for forming installation holes and fluid guide channels which are formed in the opposite surfaces (lower surfaces) thereof, and a temperature sensor 4 is installed in each of the installation holes. Hence, a temperature measurement is possible for both the heat medium fluid and the reaction fluid, and the overall temperature distribution in the heat exchanging body 41 can be grasped three-dimensionally. Each of the transmission lines of the temperature sensors 4 is electrically connected to a processing device through an input line connected by a connector (not shown), in the similar manner to that in FIG. 1.

The flat plates PA and the flat plates PB are arranged horizontally and stacked alternately in the vertical direction, and the flat plate P0 is placed at the top. In this way, a cuboidal stack body is formed. Opposite ends of the stack body are fitted into fixing members 45 of an annular quadrangle shape. The stacked members are tightly fixed by the fixing members 45 placed around the outer periphery, so that the stacked structure is maintained. In assembling the stack body, its members may be firmly fixed to each other by utilizing a bonding method such as TIG (Tungsten Inert Gas) welding or diffusion bonding. In this way, deterioration of heat conductivity due to poor contact between the members and the like are prevented. It is noted that although the heat exchanging body 41 can be configured using at least one flat plate PA and at least one flat plate PB, the larger the number of flat plates PA and flat plates PB, the higher the heat exchange performance. In this embodiment, a plurality of flat plates PA and flat plates PB are used, the number of flat plates PB is larger than the number of flat plates PA by one, and flat plates PB are located at the uppermost and lowermost positions such that the flat plates PA are sandwiched between the flat plates PB. Covering the periphery of the heat exchanging body 41 with a housing or a heat insulating material so as to suppress heat dissipation from the heat exchanging body 41 is preferable in view of suppressing the heat loss of the reactor 40. The reactor 40 may be configured to have a plurality of the heat exchanging bodies 41 with a single housing covering the plurality of heat exchanging bodies 41.

As the heat-conductive material constituting each part of the heat exchanging body 41, there is a heat-resistant metal such as an iron alloy or a nickel alloy. Specific examples include iron alloys such as stainless steels (such as SUS310, SUS304 and SUS316) and carbon steel, nickel alloys such as Inconel 625 (registered trademark), Inconel 617 (registered trademark), and Haynes 230 (registered trademark), titanium, and the like. These heat-conductive materials are preferable since they have durability (corrosion resistance) against the progress of the reaction in the reaction flow channels and combustion gases usable as the heat medium fluid. However, the material is not limited to these. Also, it may be steel plated with an iron-based material, metal coated with a heat-resistant resin such as fluororesin, carbon graphite, or the like. The fixing members 45 for fixing the stack body are made of a material having heat resistance and rigidity, and it is preferably a material that is low in heat conductivity in order to suppress the heat loss due to heat dissipation. In a case where the fixing members 45 are made of a material similar to that of the heat exchanging body 41, it is desirable to coat the fixing members 45 with a heat-insulating material. Making the housing so as to be connected to the fixing members 45 on both sides is preferable in view of suppressing heat dissipation.

The heat medium flow channels and the reaction flow channels formed in the flat plates PA and the flat plates PB respectively include a plurality of branch flow channels extending in parallel and a merge channel, as in FIG. 2A and FIG. 2B. One ends of the branch flow channels of each heat medium flow channel are connected by the merge channel which lies perpendicular thereto, while the opposite ends of the branch flow channels are open to the outside of the stack body, thereby forming inlet ports. One end of the merge channel is open to the outside of the stack body, thereby forming a discharge port 2d. Likewise, one ends of the branch channels of each reaction flow channel are open to the outside of the stack body, thereby forming inlet ports, and one end of the merge channel is open to the outside of the stack body, thereby forming a discharge port 3d.

As illustrated in FIG. 7, the heat medium flow channels and the reaction flow channels are formed such that the discharge ports 2d of the heat medium flow channels and the discharge ports 3d of the reaction flow channels are located at opposite end portions of one side surface of the heat exchanging body 41. An end plate 47 arched in a concave shape is attached in a detachable manner or in an openable-closable manner to the side surface of the heat exchanging body 41 on the side where the inlet ports of the reaction flow channels are open. With the end plate 47 covering the side surface of the heat exchanging body 41, a space is formed between the heat exchanging body 41 and the end plate 47. An inlet pipe 49 is provided in the center of the end plate 47. Thus, as the reaction fluid is supplied from the inlet pipe 49, the reaction fluid splits into the branch flow channels of each reaction flow channel out of the space between the end plate 47 and the heat exchanging body 41, and merges at the merge channel to be discharged from the discharge port 3*d*. Similarly, an end plate 51 arched in a concave shape is also attached in a detachable manner or in an openable-closable manner to the side surface of the heat exchanging body 41 on the side where the branch flow channels of each heat medium flow channel 2 are open, i.e. the opposite side from the end plate 47. With the end plate 51 covering the side surface of the heat exchanging body 41, a space is formed between the heat exchanging body 41 and the end plate 51. An inlet pipe 53 is provided in the center of the endplate 51. As the heat medium fluid is supplied from the inlet pipe 53, the heat medium fluid splits into the branch flow channels of each heat medium flow channel out of the space between the end plate 51 and the heat exchanging body 41, and merges at the merge channel to be discharged from the discharge port 2*d*. Thus, the heat medium flow channels and the reaction flow channels are formed in a counterflow design in which the heat medium fluid and the reaction fluid flow in parallel but opposite directions in their respective branch flow channels.

Further, an elongated and hollow outlet member 55 having an opening along its longitudinal direction is attached to a side surface of the heat exchanging body 41 so as to cover the discharge ports 3*d* of the reaction flow channels. As a result, a vertical merge channel connecting the discharge ports 3*d* is formed. Thus, the reaction fluid in the reaction flow channels passes through the discharge ports 3*d* to thereby merge in the outlet member 55, and is discharged from a tubular outlet port 57 provided in the center of the outlet member 55. Similarly, an elongated and hollow outlet member 59 having an opening along its longitudinal direction is attached to the same side surface of the heat exchanging body 41 so as to cover the discharge ports 2*d* of the heat medium flow channels. As a result, a vertical merge channel connecting the discharge ports 2*d* is formed. Thus, the heat medium fluid in the heat medium flow channels passes through the discharge ports 2*d* to thereby merge, and is discharged from a tubular outlet port 61 provided in the center of the outlet member 59. It is note that the direction of the reaction fluid flowing from the inlet pipe 49 to the outlet member 55 and the direction of the heat medium fluid flowing from the inlet pipe 53 to the outlet member 59 can be changed to the opposite directions.

The reaction fluid is a fluid containing a reactant being a raw material of the reaction. While flowing through the reaction flow channels, the reaction fluid receives the heat or cold of the heat medium fluid flowing through the heat medium flow channels and thereby heated or cooled, so that the reaction progresses and the reactant is converted to the product. The arrows indicated by the reference symbol R in FIG. 2A, FIG. 3B and FIG. 5 show the direction of flow of the reactant, while the arrows denoted by reference symbol M in FIG. 2B show the direction of flow of the heat medium fluid.

The heat medium flow channels and the reaction flow channels in the heat exchanging body 41 are formed as hollow portions whose cross sections perpendicular to the flow direction are rectangular. The number of these branch flow channels is not particularly limited but is determined as appropriate with the design requirements, heat transfer efficiency, and the like of the heat exchanging body 41 taken into consideration. In view of heat transfer, it is usually preferable to provide several dozen branch flow channels at intervals that are about 1.0 times the flow channel width. It is also preferable to provide the reaction flow channels and the heat medium flow channels such that the intervals between them in the vertical direction (height direction) are about 0.2 to 5.0 times the intervals between these flow channels in the transverse direction. Further, the number of flat plates PA and flat plates PB stacked is not particularly limited but it is preferable to configure the stack body (heat exchanging body 41) with its height set close to its width so that its cross section perpendicular to the flow direction can be close to a square shape.

To improve the reaction efficiency, a catalytic body that promotes the reaction of the reactant can be disposed in each of the branch flow channels of the reaction flow channels. Moreover, to improve the heat transfer efficiency, a heat transfer promoting body that promotes the transmission of heat or cold from the heat medium fluid to the heat exchanging body can be disposed in each of the branch flow channels of the heat medium flow channels.

The catalytic body is a member obtained by supporting a catalyst that promotes the reaction of the reactant on the surface of a structural material, and may be one obtained by supporting the catalyst on the structural material by using a carrier. The catalyst is selected as appropriate in accordance with the reaction to be caused to progress in the reactor. In order to increase the area of contact with the reaction fluid, the catalytic body (structural material) is usually formed in the shape of a corrugated plate with wavy round curves, but may be bent in a zigzag shape or the like. Also, the length of the catalytic body preferably corresponds to the branch flow channels of the reaction flow channels but is not limited to this. The heat transfer promoting body is a heat-conductive member that promotes the heat transfer between the heat medium fluid and the heat exchanging body by increasing the area of contact with the heat medium fluid. The heat transfer promoting body is preferably in the shape of an angularly corrugated plate in order to secure heat transfer area (contact area) to the heat exchanging body. A corrugated plate typically used as heat radiating fins or a heatsink can be utilized as the heat transfer promoting body. Examples of the heat-conductive material constituting the heat transfer promoting body include metals such as aluminum, copper, stainless steel, and iron-based plated steel. Aluminum and copper are preferable since their heat conductivity is particularly high. Naval copper, aluminum brass, and the like are also preferable in the case of cold exchange using a coolant.

It is possible to change the heat transfer efficiency by replacing a part of the whole of the heat transfer promoting body as described above. The progress of the reaction can be adjusted as well by changing the catalytic body, and the temperature can vary depending on the condition of the reaction. Thus, by making the above structural change and/or making a change in operational condition with reference to the temperature distribution obtained using the temperature sensors, it is possible to adjust the temperature gradient in the flow direction inside the heat exchanging body and the overall temperature distribution to preferable states. Also, in a case where deposition of carbon (coking) occurs at the surface of the catalytic body and lowers or deteriorates the activity of the catalyst or in a case where dust is mixed into the reaction fluid and causes clogging to decrease the reaction efficiency, such an event can be detected as a change in the temperature distribution inside the heat exchanging body obtained by the temperature sensors. Hence, by timely replacing the catalytic body, it is possible to prevent increase in the cost required for performance adjustment and maintenance of the reactor.

A heat exchanging body as described above is usable as any of a liquid-liquid heat exchanger, a gas-gas heat exchanger, and a gas-liquid heat exchanger. Thus, the reaction fluid and the heat medium fluid to be supplied into the reactor of the present disclosure may each be a gas or a liquid. Also, the configuration of the reactor of the present disclosure is applicable to a reactor in which its reaction flow channels have a large specific surface area per unit volume, or a so-called compact reactor, and the reactor can be used to implement chemical syntheses with various thermal reactions (endothermic reactions, exothermic reactions). Examples of syntheses with such thermal reactions include syntheses with endothermic reactions such as a steam reforming reaction of methane represented by the following formula (1) and a dry reforming reaction of methane represented by the following formula (2), and exothermic reactions such as a shift reaction represented by the following formula (3), a methanation reaction represented by the following formula (4), and the Fischer-Tropsch synthesis reaction represented by the following formula (5). The reaction fluids in these reactions are gaseous.

$$CH_4+H_2O \rightarrow 3H_2+CO \quad \text{Formula (1)}$$

$$CH_4+CO_2 \rightarrow 2H_2+2CO \quad \text{Formula (2)}$$

$$CO+H_2O \rightarrow CO_2+H_2 \quad \text{Formula (3)}$$

$$CO+3H_2 \rightarrow CH_4+H_2O \quad \text{Formula (4)}$$

$$(2n+1)H_2+nCO \rightarrow C_nH_{2n+2}+nH_2O \quad \text{Formula (5)}$$

Other than the above reactions, the technique of the present disclosure may also be applied to execution of reactions such as acetylation reaction, addition reaction, alkylation reaction, dealkylation reaction, hydrogen dealkylation reaction, reductive alkylation reaction, amination reaction, aromatization reaction, arylation reaction, autothermal reforming reaction, carbonylation reaction, decarbonylation reaction, reductive carbonylation reaction, carboxylation reaction, reductive carboxylation reaction, reductive coupling reaction, condensation reaction, decomposition (cracking) reaction, hydrogen decomposition reaction, cyclization reaction, cyclooligomerization reaction, dehalogenation reaction, dimerization reaction, epoxidation reaction, esterification reaction, exchange reaction, halogenation reaction, hydrogenation reaction, hydrogen halogenation reaction, homologation reaction, hydration reaction, dehydration reaction, dehydrogenation reaction, hydrogen carboxylation reaction, hydrogen formylation reaction, hydrogenolysis reaction, hydrogen metalation reaction, hydrosilylation reaction, hydrolysis reaction, hydrotreating reaction, isomerization reaction, methylation reaction, demethylation reaction, metathesis (substitution) reaction, nitration reaction, oxidation reaction, partial oxidation reaction, polymerization reaction, reduction reaction, reverse water gas shift reaction, sulfonation reaction, telomerization reaction, transesterification reaction, and trimerization reaction.

A fluid containing a substance (reactant) such as a raw material to participate in a chemical reaction as listed above can be supplied as a reaction fluid to the reactor to synthesize a target product. The reaction fluid may contain a carrier that is not involved in the reaction. The carrier can be appropriately selected from the substances that do not affect the progress of the reaction, in consideration of the chemical reaction to be carried out. Carriers usable for a gaseous reaction fluid include gaseous carriers such as an inert gas or a low-reactive gaseous substance (at the temperature inside the reactor).

Also, fluidic substances that do not corrode the constituent material of the reactor are usable as the heat medium fluid. For example, liquid substances such as water and oil and gaseous substances such as a combustion gas are usable. A configuration using a gaseous substance as the heat medium fluid is easy to handle as compared to the case of using a liquid medium.

The catalyst constituting the catalytic body contains, as a main component, an active metal which is effective in promoting the progress of the chemical reaction as mentioned above. A catalyst suitable for the promotion of the reaction is selected as appropriate based on the synthetic reaction to be implemented in the reactor 40. Examples of the active metal as the catalytic component include Ni (nickel), Co (cobalt), Fe (iron), Pt (platinum), Ru (ruthenium), Rh (rhodium), Pd (palladium), and the like, and one of them may be used or two or more of them may be used in combination as long as they are effective in promoting the reaction. The catalytic body is prepared by supporting, on a structural material, the catalyst selected in accordance with the reaction to be carried out. For the structural material, a metal that can be shaped and support the catalyst is selected from available heat-resistant metals, and it is shaped into a corrugated thin-plate shape corresponding to the abovementioned catalytic body. Examples of the heat-resistant metal include heat-resistant alloys containing, as their main component, one or more metals such as Fe (iron), Cr (chromium), Al (aluminum), Y (yttrium), Co (cobalt), Ni (nickel), Mg (magnesium), Ti (titanium), Mo (molybdenum), W (tungsten), Nb (niobium), and Ta (tantalum). For example, the catalytic body is preferably made by shaping a thin-plate structural material made of a heat-resistant alloy such as Fecralloy (registered trademark). A commercially available product shaped as a corrugated plate may instead be obtained and used. As for the method of loading the catalyst, it can be carried out by using existing technique, and a suitable method may be selected as appropriate from well-known methods depending on the catalyst to be used. Specifically, there are: a method of directly supporting the catalyst on the structural member by surface modification or the like; a method of indirectly supporting the catalyst by using a carrier, and so on. Practically, it is easy to support the catalyst by using the carrier. As the carrier, a material that is durable and does not impede the progress of the reaction to be carried out in the reactor 40, and that can carry the catalyst to be used in a good manner is selected as appropriate with the reaction taken into consideration. Examples of the carrier include metal oxides such as $Al_2O_3$ (alumina), $TiO_2$ (titania), $ZrO_2$ (zirconia), $CeO_2$ (ceria), and $SiO_2$ (silica), and one or more of them can be selected and used as the carrier. The supporting method using the carrier can be selected as appropriate from publicly known methods. Examples of the method include a method in which a layer of a mixture of the catalyst and the carrier is formed on the surface of the shaped structural material, a method in which a layer of the carrier is formed and then the catalyst is loaded thereon by surface modification or the like, and so on.

By applying the technique of the present disclosure to a heat exchange-type reactor in which a thermal reaction involving generation or absorption of heat is caused to progress by utilizing heat exchange with a heat medium fluid, it is possible to measure the temperature of the fluid flowing in the flow channel without increasing the resistance to flow of the fluid. Since a reactor is provided such that it is easy to measure temperature distributions inside its heat exchanging body and changes in temperature in a flow channel along the flow direction, the deformation due to thermal stress is reduced and therefore the durability and usage life of the reactor can be improved. This can contribute to reduction of the maintenance cost, stable supply of the target reaction product, and reduction of the production cost.

Although preferred embodiments of the present disclosure have been described above with reference to the accompanying drawings, the present disclosure is not limited to those embodiments. It is to be understood that various changes and modifications that those skilled in the art can conceive of also belong to the technical scope of the present disclosure are also within the scope described in the claims, as a matter of course.

What is claimed is:

1. A reactor comprising:
a heat exchanging body including therein a heat medium flow channel in which a heat medium fluid is caused to flow, and a reaction flow channel in which a reaction fluid is caused to flow; and
at least one detection part that detects temperature of a fluid flowing in at least one flow channel of the heat medium flow channel and the reaction flow channel,
wherein the heat exchanging body has:
at least one installation hole formed to extend in a skew position with respect to the at least one flow channel so as to include an opening portion communicating with the at least one flow channel, in which the at least one detection part is installed at the opening portion so as to be contactable with the fluid flowing in the at least one flow channel; and
at least one fluid guide hole formed along the at least one flow channel from the opening portion of the at least one installation hole.

2. The reactor according to claim 1, wherein a transmission line is connected to the at least one detection part, the at least one installation hole is formed to extend linearly from the opening portion to an outside, and the transmission line is installed in the at least one installation hole.

3. The reactor according to claim 1, wherein the at least one installation hole extends in a direction perpendicular to the at least one flow channel.

4. The reactor according to claim 1, wherein the at least one fluid guide hole has a narrowing tip portion on an opposite side from the opening portion.

5. The reactor according to claim 1, wherein the at least one fluid guide hole is formed so as to allow the fluid flowing in the at least one flow channel to gradually spread toward the opening portion.

6. The reactor according to claim 1, wherein the at least one fluid guide hole is connected to the opening portion of the at least one installation hole with no step present therebetween and extends in two directions from the opening portion.

7. The reactor according to claim 1, wherein
the at least one flow channel is formed to include a plurality of branch flow channels separating from each other, and the at least one detection part includes a plurality of detection parts,
wherein the at least one installation hole includes a plurality of installation holes, and the plurality of installation holes are each formed to extend in a skew position with respect to one of the plurality of branch flow channels so as to include an opening portion communicating with the one of the plurality of branch flow channels, and
wherein the at least one fluid guide hole includes a plurality of fluid guide holes each formed along one of the plurality of branch flow channels from the opening portion of the corresponding one of the plurality of installation holes.

8. The reactor according to claim 1, wherein the at least one detection part includes:
a first detection part that detects temperature of the heat medium fluid flowing in the heat medium flow channel; and
a second detection part that detects temperature of the reaction fluid flowing in the reaction flow channel,
the at least one installation hole includes:
a first installation hole formed to extend in a skew position with respect to the heat medium flow channel so as to include an opening portion communicating with the heat medium flow channel, in which the first detection part is installed at the opening portion so as to be contactable with the heat medium fluid flowing in the heat medium flow channel; and
a second installation hole formed to extend in a skew position with respect to the reaction flow channel so as to include an opening portion communicating with the reaction flow channel, in which the second detection part is installed at the opening portion so as to be contactable with the reaction fluid flowing in the reaction flow channel, and
the at least one fluid guide hole includes:
a first fluid guide hole formed along the heat medium flow channel from the opening portion of the first installation hole; and
a second fluid guide hole formed along the reaction flow channel from the opening portion of the second installation hole.

9. The reactor according to claim 1, wherein the at least one detection part includes a plurality of detection parts that detect the temperature of the fluid flowing in one flow channel among the heat medium flow channel and the reaction flow channel,
wherein the at least one installation hole includes a plurality of installation holes formed to extend in skew positions with respect to the one flow channel so as to include opening portions communicating with the one flow channel at mutually different positions, in which the plurality of detection parts are installed respectively at the opening portions of the plurality of installation holes so as to be contactable with the fluid flowing in the one flow channel at mutually different positions, and
wherein the at least one fluid guide hole includes a plurality of fluid guide holes respectively formed from each of the opening portions of the plurality of installation holes along the one flow channel.

* * * * *